United States Patent
Ahola et al.

(10) Patent No.: US 11,160,282 B2
(45) Date of Patent: Nov. 2, 2021

(54) USE OF A COMPOSITION AND METHOD FOR REDUCING BACTERIAL SPORES IN PULP SUSPENSION

(71) Applicant: Kemira Oyj, Helsinki (FI)

(72) Inventors: Juhana Ahola, Vantaa (FI); Marko Kolari, Vantaa (FI)

(73) Assignee: Kemira Oyj, Helsinki (FI)

( * ) Notice: Subject to any disclaimer, the term of this patent is extended or adjusted under 35 U.S.C. 154(b) by 0 days.

(21) Appl. No.: 16/093,671

(22) PCT Filed: May 12, 2017

(86) PCT No.: PCT/FI2017/050367
§ 371 (c)(1),
(2) Date: Oct. 15, 2018

(87) PCT Pub. No.: WO2017/194842
PCT Pub. Date: Nov. 16, 2017

(65) Prior Publication Data
US 2019/0082697 A1    Mar. 21, 2019

(30) Foreign Application Priority Data

May 13, 2016    (FI) .................................. 20165408

(51) Int. Cl.
*A01N 47/44*    (2006.01)
*A01N 33/04*    (2006.01)
*A01N 43/80*    (2006.01)

(52) U.S. Cl.
CPC ............. *A01N 47/44* (2013.01); *A01N 33/04* (2013.01); *A01N 43/80* (2013.01)

(58) Field of Classification Search
None
See application file for complete search history.

(56) References Cited

U.S. PATENT DOCUMENTS

| | | | |
|---|---|---|---|
| 4,725,623 A | 2/1988 | Whitekettle | |
| 5,041,463 A * | 8/1991 | Whitekettle ........... | A01N 47/44 162/161 |
| 5,128,133 A | 7/1992 | Hidaka et al. | |
| 5,449,658 A * | 9/1995 | Unhoch ................. | A01N 47/44 424/613 |
| 5,532,413 A | 7/1996 | Matz et al. | |
| 2010/0314316 A1* | 12/2010 | Yin ........................ | C02F 1/76 210/636 |

FOREIGN PATENT DOCUMENTS

| | | |
|---|---|---|
| CN | 101933522 A | 1/2011 |
| DE | 4036987 A1 | 5/1991 |
| EP | 0472311 A2 | 2/1992 |
| GB | 794406 A | 5/1958 |
| GB | 1091049 A | 11/1967 |
| RU | 2549771 C2 | 4/2015 |
| WO | 0153216 A1 | 7/2001 |
| WO | 0166471 A2 | 9/2001 |
| WO | 2007125154 A1 | 11/2007 |
| WO | 2010000744 A2 | 1/2010 |

OTHER PUBLICATIONS

Finnish Patent and Registration Office, Search report of Finnish application FI20165408, dated Aug. 12, 2016.
Luo Mi et al, Chemical insights into dodecylamine spore lethal germination, Chemical Science, Jun. 2014, pp. 3320-3324.
Sherpherd, Julia A. et al, Antibacterial Action of 2-Bromo-2-Nitropropane-1,3-Diol (Bronopol), Antimicrobial Agents and Chemotherapy, Nov. 1998, pp. 1693-1698, vol. 32, No. 11.
Tianen Cheng et al.: "Handbook of antifungal and mildewproof agents, Edition 1, p. 66, Shanghai Science and Technology Literature Publishing House", Mar. 31, 1993.
China Chemical Products Collection, Edition 3, Organization of Chemical Industry Press, p. 1280, Chemical Industry Press, Jan. 31, 2005.
Wikipedia Article "Bacillus Subtilis" from www://de.wikipedia.org/wiki/Bacillus_subtilis# ; Received as an annex for Notice of Opposition against EP3454656B1, dated Jun. 24, 2021. A machine translation is provided from corresponding website edited on Jun. 14, 2021, 12 pages.
United States Environmental Protection Agency, EPA Registration No. 39967-107, N-2000 Antimicrobial 2015, 9 pages. Received as an annex for Notice of Opposition against EP345465661, dated Jun. 24, 2021.
Verichem, Technical Data Sheet of N-2000, 2 pages. Received as an annex for Notice of Opposition against EP345465661, dated Jun. 24, 2021.
European Patent Office, Notice of Opposition against EP3454656B1, dated Jun. 24, 2021, 31 pages.
European Patent Office, Consolidated list, received as an annex of Notice of Opposition against EP3454656B1, dated Jun. 24, 2021.

\* cited by examiner

*Primary Examiner* — Melissa L Fisher
(74) *Attorney, Agent, or Firm* — Meunier Carlin & Curfman LLC (57) ABSTRACT

The invention relates to use of a composition comprising a cationic surfactant, which comprises a primary or secondary ammonium head group and a linear unsubstituted C12-alkyl tail, for inducing germination of bacterial endospores in pulp suspension for making of paper, board or the like. The invention relates also to a method for quantitatively reducing bacterial endospores in pulp suspension for making of paper, board or the like. The method comprises obtaining of aqueous pulp suspension, and administering the said composition to the pulp suspension. The cationic surfactant is allowed to interact with bacterial endospores in the pulp suspension. Germination of endospores and destroying microorganisms is thus induced.

24 Claims, 4 Drawing Sheets

USE OF A COMPOSITION AND METHOD FOR REDUCING BACTERIAL SPORES IN PULP SUSPENSION

PRIORITY

This application is a U.S. national application of the international application number PCT/FI2017/050367 filed on May 12, 2017 and claiming priority of Finnish application No. 20165408 filed on May 13, 2016 the contents of all of which are incorporated herein by reference.

The present invention relates to a use of a composition and a method for quantitatively reducing bacterial spores in pulp suspension for making of paper, board or the like according to the preambles of enclosed independent claims.

Bacterial cells are normally present in the aqueous environments of pulp mills as well as paper and board mills. Bacterial growth in the process is commonly monitored and limited by using various measures, e.g. feeding of biocides into the process. However, certain bacterial cells form endospores, which are highly resistant to typical bacterial destruction methods, such as heat, disinfectants, chemical biocides, desiccation, ultraviolet light and ionizing radiation. The endospores may remain viable but dormant for prolonged periods, even for years, until the external conditions become favourable, after which the transformation, i.e. germination, of bacterial endospore takes place.

The amount of endospores in the final paper or board product may be a problem, especially if the product is intended for hygiene purposes, food or beverage packaging. Consequently there is an interest in the paper and board production to reduce not only the bacteria but also the dormant endospores.

An object of this invention is to minimise or possibly even eliminate the disadvantages existing in the prior art.

Another object of the present invention is to provide an effective method for quantitatively reducing microorganisms and/or bacterial spores in the aqueous environment of pulp mill, paper mill or board mill.

A further object of the present invention is to provide an effective composition for inducing germination of bacterial endospores in the aqueous environment of pulp mill, paper mill or board mill.

These objects are attained with the invention having the characteristics presented below in the characterising parts of the independent claims.

Some preferred embodiments of the invention are presented in the dependent claims.

All the described embodiments and advantages apply all aspects of the present invention, i.e. use and method, when applicable, even if not always explicitly stated so.

Typical use of a composition, which comprises a cationic surfactant comprising a primary or secondary ammonium head group and a linear unsubstituted C12-alkyl tail according to the present invention, is for inducing germination of bacterial endospores in pulp suspension for making of paper, board or the like.

Typical method according to the present invention for quantitatively reducing bacterial spores in pulp suspension for making of paper, board or the like, the method comprising obtaining aqueous pulp suspension,
administering a cationic surfactant comprising a primary or secondary ammonium head group and linear unsubstituted C12-alkyl tail to the pulp suspension,
allowing the cationic surfactant to interact with possible microorganisms, such as bacteria, and/or bacterial endospores in the pulp suspension, and
inducing germination of endospores and/or destroying microorganisms.

Now it has been surprisingly found that a cationic surfactant, which comprises a primary or secondary ammonium head group and linear unsubstituted C12-alkyl tail, effectively interacts with dormant endospores and induces their germination to vegetative form in a pulp suspension. After germination the microorganisms, such as bacteria, are present in vegetative form in the pulp suspension, and they can be easily destroyed, either by using a biocidal agent, heat or by the cationic surfactant itself. It is surprising that the cationic surfactant can successfully interact with the dormant endospores in the complex pulp suspension matrix, which comprise various interfering substances and solid particles, e.g. free cations, mineral particles and fibres. Furthermore, the cationic surfactant may also interact and destroy vegetative microorganisms, such as bacteria, present in the pulp suspension. The present invention thus enables manufacture of hygienic paper or board from spore-containing pulp suspension, which has been difficult or impossible with conventional methods.

The present invention comprises obtaining of an aqueous pulp suspension, which comprises lignocellulosic fibres. The aqueous pulp suspension may comprise virgin fibres from mechanical pulping process and/or chemical pulping process, for example, from kraft pulping, chemi thermomechanical pulping process. The pulp suspension may additionally or alternatively comprise recycled fibres and/or broke from paper or board making process. The fibres may be bleached or unbleached.

The present invention is suitable for use in a pulp mill, a board mill or a paper mill.

According to one preferable embodiment of the invention the cationic surfactant is n-dodecylamine, dodecylguanidine salt or their mixture, more preferably n-dodecylamine or dodecylguanidine salt, such as dodecylguanidine hydrochloride or dodecylguanidine acetate. Even more preferably the cationic surfactant may be n-dodecylamine or dodecylguanidine hydrochloride.

As described above, the cationic surfactant is allowed to interact with bacterial endospores, and optionally also with possible microorganisms, such as bacteria, in the pulp suspension. The cationic surfactant induces the germination of the bacterial endospores. The germinated endospores can then be destroyed by free unconsumed cationic surfactant, additional oxidative biocide or by heat. The pulp suspension is subjected to heat for example when the fibre web formed from the pulp suspension is dried at the drying section of paper or board machine. In addition, the cationic surfactant may directly interact with microorganisms, such as vegetative bacteria, and destroy them.

According to one embodiment of the invention the composition may comprise at least 10 weight % of cationic surfactant comprising a primary or secondary ammonium head group and a linear unsubstituted C12-alkyl tail,
a organic solvent, which comprises at least one —OH group, and
optionally water.

The composition may comprise 10-60 weight-%, preferably 20-47 weight-%, more preferably 25-45 weight-%, of the cationic surfactant, preferably n-dodecylamine, dodecylguanidine salt or their mixture, more preferably n-dodecylamine or dodecylguanidine salt, such as dodecylguanidine hydrochloride or dodecylguanidine acetate, preferably dodecylguanidine hydrochloride. Preferably the composition comprises as high amount of cationic surfactant as possible, taking into account is solubility and avoiding phase separation.

The composition may comprise an organic solvent, which comprises at least one OH-group for providing solubility of the cationic surfactant. The organic solvent may be any organic solvent having at least one OH-group, but preferably the organic solvent is selected from glycols or alcohols, and even more preferably the organic solvent is selected from ethanol, isopropyl alcohol and dipropylene glycol. According to one preferable embodiment the organic solvent is dipropylene glycol, which is advantageous in industrial applications due to its low inflammability. Dipropylene glycol is here understood as a mixture of isomers of oxybispropanol. Organic solvent in general improves the stability and pumpability of the composition. Further, the composition may comprise an additional stabiliser, if needed.

The composition may comprise 10-90 weight-%, preferably 10-60 weight-%, more preferably 10-50 weight-%, even more preferably 20-47 weight-%, sometimes even more preferably 25-45 weight-%, of organic solvent. The ratio of cationic surfactant to the organic solvent may be from 10:90 to 60:40 in the composition. According to one preferable embodiment the ratio of cationic surfactant to the organic solvent may be about 1:1.

According to one preferable embodiment the composition comprises water in addition of the cationic surfactant and organic solvent, as well as optional biocidal agent as explained below. Water is used to add the total amount of composition in the various recipes up to 100 weight-%.

In some embodiments the solubility of the cationic surfactant may be improved by an addition of an acid, such as hydrochloric acid.

The composition may further comprise a biocidal agent, such as water-soluble biocide. The biocidal agent may be a non-oxidizing biocide. In an exemplary embodiment, the non-oxidizing biocides can include glutaraldehyde, 2,2-dibromo-3-nitrilopropionamide (DBNPA), 2-bromo-2-nitropropane-1,3-diol (Bronopol), carbamates, 5-chloro-2-methyl-4-isothiazolin-3-one (CMIT), 2-methyl-4-isothiazolin-3-one (MIT), 1,2-dibromo-2,4-dicyano butane, bis(trichloromethyl)sulfone, 2-bromo-2-nitrostyrene, 4,5-dichloro-1,2-dithiol-3-one, 2-n-octyl-4-isothiazolin-3-one, 1,2-benzisothiazolin-3-one, ortho-phthaldehyde, quaternary ammonium compounds (="quats"), such as n-alkyl dimethyl benzyl ammonium chloride, didecyl dimethyl ammonium chloride (DDAC) or alkenyl dimethylethyl ammonium chloride, other guanidines than dodecylguanidine salts, biguanidines, pyrithiones, 3-iodopropynyl-N-butylcarbamate, phosphonium salts, such as tetrakis hydroxymethyl phosphonium sulfate (THPS), dazomet, 2-(thiocyanomethylthio) benzothiazole, methylene bisthiocyanate (MBT), and any combinations thereof. Preferably non-oxidizing biocides are selected from 5-chloro-2-methyl-4-isothiazolin-3-one (CMIT) and 2-methyl-4-isothiazolin-3-one (MIT). The composition may comprise 0.01-20 weight-%, preferably 1-20 weight-%, more preferably 5-15 weight-%, even more preferably 7-10 weight-%, of biocidal agent. The biocidal agent improves the antimicrobial effect of the composition by slowing down the metabolism of the vegetative microorganisms and germinated endospores.

In one embodiment of the invention an oxidizing biocide is added to the pulp suspension, preferably after the administering of the composition comprising cationic surfactant, and downstream from the point of administration of the composition. The addition of the oxidizing biocide provides thus an efficient post-treatment after addition of the composition comprising cationic surfactant. The oxidizing biocide destroys quickly the possible vegetative microorganisms, such as bacteria, present after the induced germination and/or remaining in the pulp suspension after treatment with the composition. The oxidizing biocide also reduces the risk for excessive growth of vegetative microorganisms, which might in some circumstances result from germination of the endospores. The composition comprising the cationic surfactant is administered to the pulp suspension at least 15 min, preferably at least 30 min, more preferably at least 90 min, before administration of oxidizing biocide. In this manner it is possible to guarantee a sufficient reaction time with the cationic surfactant and the dormant endospores for germination to vegetative form.

According to one embodiment of the invention the oxidizing biocide may be an oxidant selected from chlorine, alkali and alkaline earth hypochlorite salts, hypochlorous acid, chlorinated isocyanurates, bromine, alkali and alkaline earth hypobromite salts, hypobromous acid, bromine chloride, chlorine dioxide, ozone, hydrogen peroxide, peroxy compounds, such as peracetic acid, performic acid, percarbonate or persulfate salts, halogenated hydantoins, e.g., monohalodimethylhydantoins such as monochlorodimethylhydantoin, or dihalodimethylhydantoins such as chlorobromodimethylhydantoin, monochloramines, monobromamines, dihaloamines, trihaloamines, or any combinations thereof. Alkali and alkaline earth hypochlorite salts, such as sodium hypochlorite, are being preferred. The oxidizing biocide is administered to the pulp suspension in amount of 1-30 ppm, preferably 5-20 ppm, more preferably 7-10 ppm, as total active chlorine or percarboxylic acid.

The composition comprising cationic surfactant may be administered as a single dose, as constant feed or periodically as separate doses administered at predetermined time intervals. According to one embodiment the composition comprising the cationic surfactant is administered continuously to the pulp suspension. Single dose or periodical administration may be performed at the time of a process change, such as machine start-up after production stop, either at pulp mill or board mill or paper mill. Single dose administration may also be used if it is known or suspected that the raw material may be contaminated by dormant endospores. In this case the raw material may be treated with the composition before its introduction to the paper or board making process.

According to one preferable embodiment the composition comprising cationic surfactant is administered to pulp suspension having a consistency of 1-10 weight-%, preferably 3-10 weight-%, more preferably 3-7 weight-%. In other words the composition is preferably administered to so-called thick stock.

In general, it is possible to administer the composition comprising cationic surfactant to at least one of the process locations selected from a pulp and/or broke storage tower, a pulp thickener, a pulp and/or broke pulper. The exact location depends, inter alia, if the administration is performed in a pulp mill or in a board/paper mill. Preferably the composition is administered early in the process, in order to guarantee an effective time for interaction between the cationic surfactant of the composition and the dormant endospores. For example, the composition may be administered to circulation line, which feeds thick pulp suspension comprising broke and having consistency of ≥3% to a broke tower. In this manner the time of interaction is prolonged, even up to several hours.

According to one embodiment of the invention the composition comprising cationic surfactant is administered in amount that provides a negative delta spore value between inlet and outlet of the selected process location. Negative delta spore value means that the endospore value measured from the pulp suspension at the inlet of a process location is higher than the endospore value measured from the pulp suspension at the outlet of the same process location, i.e. the difference between the two values is negative. The composition may be administered in amount that provides a dosage of the cationic surfactant to the pulp suspension in the range of 1-1000 ppm, preferably 10-500 ppm, more preferably 50-200 ppm, calculated as active cationic surfactant.

According to one embodiment of the invention a chelating agent, such as DTPA or EDTA, is added to the pulp suspension at the latest with the administration of the cationic surfactant. Chelating agent interacts with the possible cations present in the pulp suspension and thus inhibits their interference to the interaction between the cationic surfactant and the endospore cortex. In another embodiment it is possible to add a chelating agent, such as DTPA or EDTA, to the pulp suspension before the administration of the cationic surfactant in order to guarantee effective interaction between the chelating agent and the cationic surfactant. The chelating agent may be added to the pulp suspension in amount of 1-100 ppm, preferably 10-50 ppm, more preferably 15-25 ppm, calculated as active agent. Preferably the chelating agent is selected from EDTA or DTPA. Use of chelating agent is especially advantageous when the concentration of cations in the pulp suspension is at least 5 ppm. The use of chelating agents is especially advantageous if the pulp suspension comprises $Fe^{3+}$ or $Cu^{2+}$ cations. Usually use of chelating agents is preferable if the pulp suspension comprises recycled fibres.

The temperature of the fibrous pulp suspension during the administration of the composition comprising the cationic surfactant may be at least +30° C., preferably +40-+70° C. It has been observed that the elevated temperature of the pulp suspension improves the germination effect obtainable by the cationic surfactant.

The pH of the pulp suspension is preferably in the range of 4-12 in order to guarantee the optimal interaction with the cationic surfactant and microorganisms and/or the bacterial endopores.

The pulp suspension treated with the composition comprising cationic surfactant may be formed into a fibrous web of paper, board or tissue and dried. The present method enables, for example, production of board which contains a microorganism level, i.e. bacterial level, which is less than about 2500 cfu/g, preferably less than about 2000 cfu/g, more preferably less than about 1500 cfu/g, even more preferably less than about 1000 cfu/g, or more preferably less than about 500 cfu/g, or most preferably less than about 250 cfu/g.

EXPERIMENTAL

Some embodiments of the invention are described more closely in the following non-limiting examples.

Example 1

Figure 1:
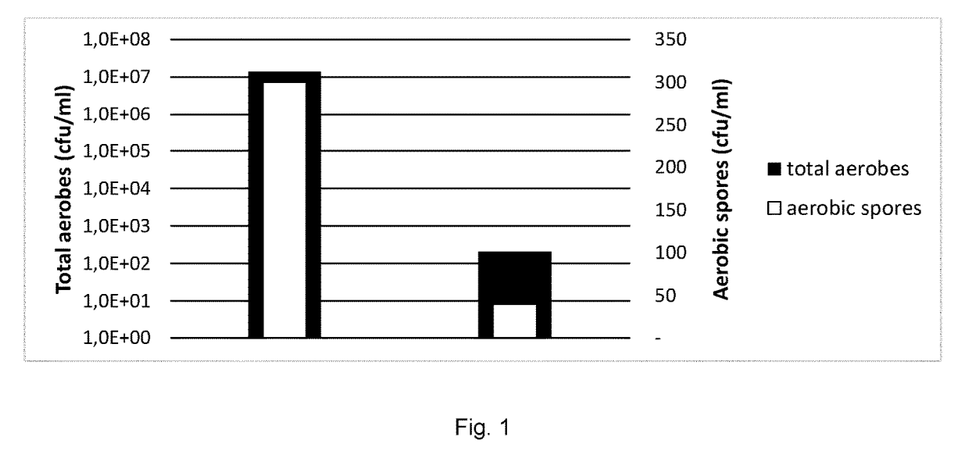

This on-site side-flow test was performed at an alkaline board machine, which produces 3-ply food packaging board, in order to test efficacy of Composition 1-1 according to the invention and comprising cationic surfactant against total aerobes and aerobic spores of broke tower (consistency 3.5%, pH 7.2, Oxidation Reduction Potential, ORP, +158 mV). Cationic surfactant was dosed (contact time 90 min, 180 rpm) as 150 ppm dodecylamine into broke sample, which after total aerobes and aerobic spore counts were quantitated (plate count agar, +45° C./+37° C., 2 days incubation) at an external laboratory. Prior to the bacterial spore determination, samples were pasteurized at +80° C. for 20 min. Results are shown in FIG. 1. The left hand column shows the broke reference sample with no added biocide, the right hand column the broke sample dosed with Composition 1-1.

FIG. 1 shows that the untreated broke (3.5% consistency, pH 7.2, ORP +158 mV) contained much aerobic bacteria, 14 000 000 cfu/ml, as well as aerobic spores, 300 cfu/ml. The use of Composition 1-1 according to the invention markedly decreased total aerobes from 14 000 000 cfu/ml to 200 cfu/ml and aerobic spores from 300 cfu/ml to 40 cfu/ml. Obtained results thus indicate that the Composition 1-1 can effectively hygienize broke with an economically feasible dosage. Eventually such broke hygienization treatment enables food packaging board mills to produce the highest hygiene board grades with maximum bacteria content of 250 cfu per gram of dry final board.

Example 2

Figure 2:
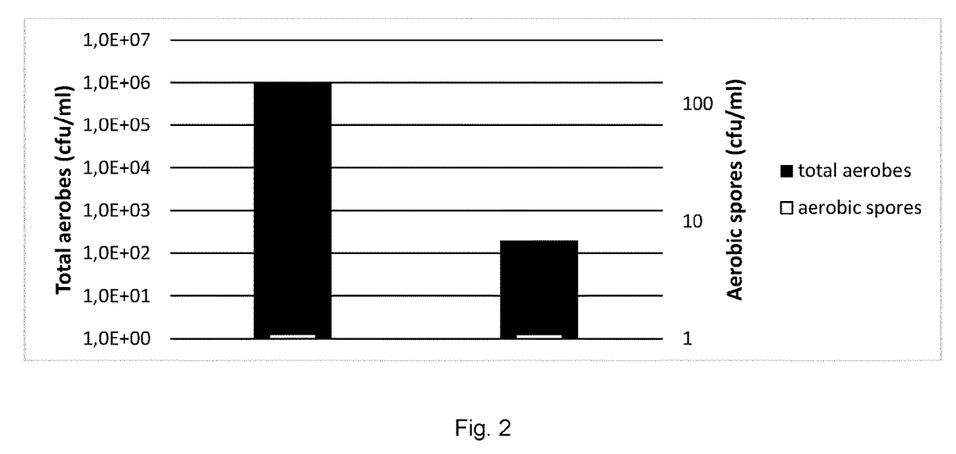

This on-site side-flow test was performed at an alkaline board machine, which produces 3-ply food packaging board, in order to test efficacy of Composition 1-2 according to the invention and comprising cationic surfactant against total aerobes and aerobic spores of incoming mechanical pulp (consistency 5.4%, pH 6.5, ORP −190 mV). The cationic surfactant was dosed (+48° C., 75 min, 180 rpm) as 150 ppm dodecylamine into pulp sample. Total aerobes and aerobic spore counts were quantitated (plate count agar, +45° C./+37° C., 2 days incubation) at an external laboratory. Prior to the bacterial spore determination, samples were pasteurized at +80° C. for 20 min. Results are shown in FIG. 2. The left hand column shows the pulp reference sample with no added biocide, the right hand column the pulp sample dosed with Composition 1-2.

FIG. 2 shows that the untreated incoming pulp (5.4% consistency, pH 6.5, ORP −190 mV) contained much aerobic bacteria, 1 000 000 cfu/ml, but no spores, <10 cfu/ml. Due to the dosing of Composition 1-2, total aerobes were effectively killed as the level decreased from 1 000 000 cfu/ml to 200 cfu/ml. Obtained results thus indicate that Composition 1-2 can effectively hygienize pulp despite the high fibre content (5.4% consistency) and low ORP (−190 mV) at economically feasible dosage rate. Eventually the hygienisation of pulp enables food packaging board mills to produce highest hygiene board grades where bacteria content is max 250 cfu per gram of dry final board.

Example 3

Figure 3:
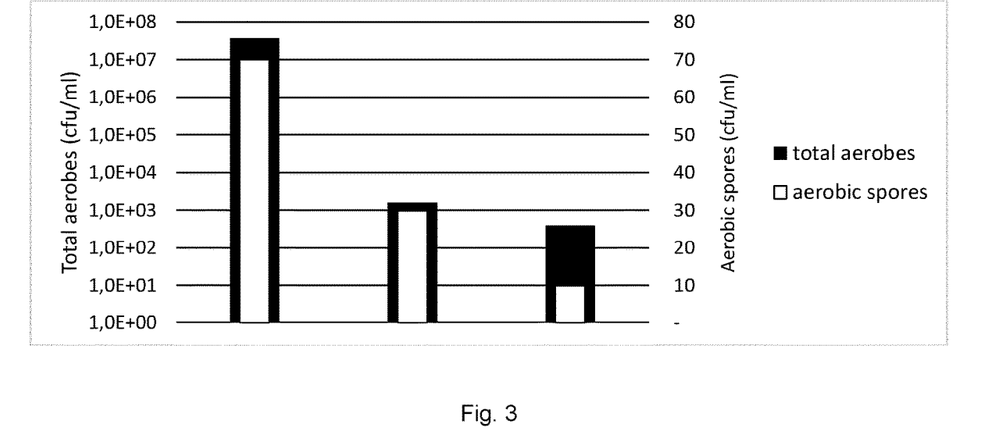

This on-site side-flow test was performed at an alkaline board machine, which produces 3-ply food packaging board, in order to test efficacy of the method according to the invention against total aerobes and aerobic spores of broke tower (consistency 3.5%, pH 7.2, ORP +65 mV). The cationic surfactant, i.e. Composition 1-3, was dosed (75 min, 180 rpm) as 150 ppm dodecylamine into broke sample, and there after post-treated (30 min, 180 rpm) with sodium hypochlorite (as 10 ppm active chlorine) in order to improve killing effect against vegetative and germinated cells. Total aerobes and aerobic spore counts were quantitated (plate count agar, +45° C./+37° C., 2 days incubation) at an external laboratory. Prior to the bacterial spore determination, samples were pasteurized at +80° C. for 20 min. Results are shown in FIG. 3. The left hand column shows the broke reference sample with no added biocide, the middle column shows the broke sample dosed with Composition 1-3, and the right hand column the broke sample dosed with Composition 1-3 and with sodium hypochlorite.

FIG. 3 shows that the untreated broke (3.5% consistency, pH 7.2, ORP +65 mV) contained much aerobic bacteria, 37 000 000 cfu/ml, and some aerobic spores, 70 cfu/ml. The composition 1-3 markedly decreased level of total aerobes from 37 000 000 cfu/ml to 1 600 cfu/ml, and showed also sporicidal effect as the aerobic spore counts decreased from 70 cfu/ml to 30 cfu/ml. Bacteria and spore killing effect was further improved by introducing a sodium hypochlorite post-treatment, as 10 ppm active chlorine. The microbiological quality of the broke was drastically improved; total aerobes content decreased from 37 000 000 cfu/ml to 400 cfu/ml, and aerobic spore counts from 70 cfu/ml to 10 cfu/ml. Obtained results thus indicate that the method according to the invention provides an economically feasible solution for broke hygienisation, which eventually enables food packaging board mills to produce the highest hygiene board grades with maximum bacteria content of 250 cfu per gram of dry final board.

Example 4

Reference

Figure 4:
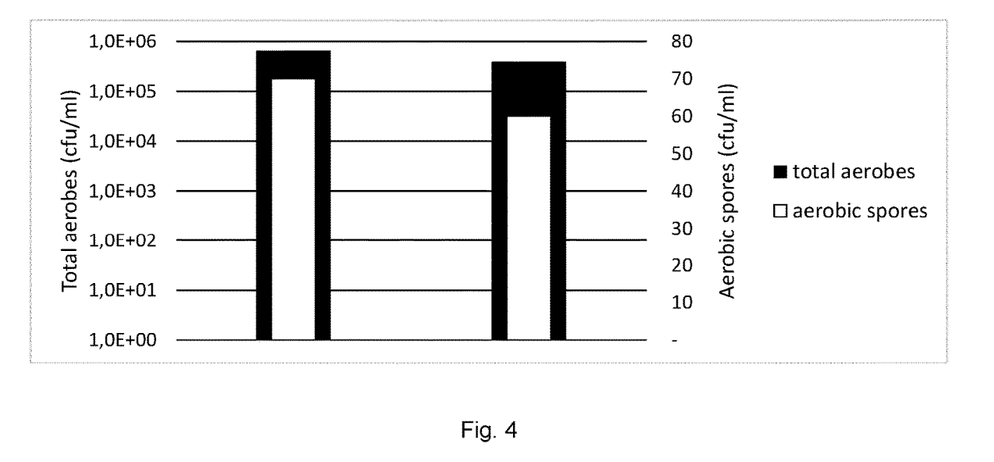

This laboratory test was performed in order to test killing effect of sodium hypochlorite against total aerobes and aerobic spores in broke sample (consistency 1.0%, pH 7.8, ORP +146 mV) taken from an alkaline board machine, which produces 3-ply food packaging board. Total aerobes and aerobic spore counts were quantitated by using plate count agar (+45° C./+37° C., 2 days incubation). Prior to the bacterial spore determination, samples were pasteurized at +80° C. for 20 min. Results are shown in FIG. 4. The left hand column shows the broke reference sample with no added biocide with 1 day contact time, the right hand column the broke sample dosed with sodium hypochlorite with 1 day contact time.

FIG. 4 shows that the untreated broke (1.0% consistency, pH 7.8, ORP +146 mV) contained much aerobic bacteria, 650 000 cfu/ml, and some aerobic spores, 70 cfu/ml. Sodium hypochlorite treatment, as 10 ppm active chlorine, showed only weak killing effect, as total aerobes level remained at high level, 390 000 cfu/ml, despite the chlorine treatment. Similarly, the sodium hypochlorite treatment, as 10 ppm active chlorine, was ineffective against mature spores, as aerobic spore content remained at close to initial level of 60 cfu/ml. Obtained results thus indicate that sodium hypochlorite, as 10 ppm active chlorine, alone may not be used to effectively hygienize broke.

Example 5

This test was performed in a pilot paper machine producing 1-ply paper. Aim of the test was to verify efficacy of the invention to provide a low quantity of aerobic bacteria and aerobic bacterial spores in dry paper end-product. Composition 1-5 comprising 40 weight-% of dodecylamine, 40 weight-% of dipropylene glycol and 20 weight-% of water was used according to the invention. It was dosed as 100, 150 or 300 mg/l into pulp suspension with 2.25% consistency. The pulp suspension was then mixed 120 rpm for 30 min at +40° C. The pulp suspension was made from a batch of authentic, spore-contaminated folding-box board with average spore content of 7000 cfu/gram of dry board. All pulp suspensions in the pilot paper machine were also post-treated (5 min, 120 rpm) with glutaraldehyde (dose: 50 ppm as active agent) in order to maintain control of vegetative bacterial cells in the pilot machine. Total aerobic bacteria (without pasteurization) and aerobic spores (with pasteurization step at +82° C. for 10 min) were quantified from the dry paper end product according to the ISO 8784-1 standard for microbiological examination of paper and board.

Figure 5:
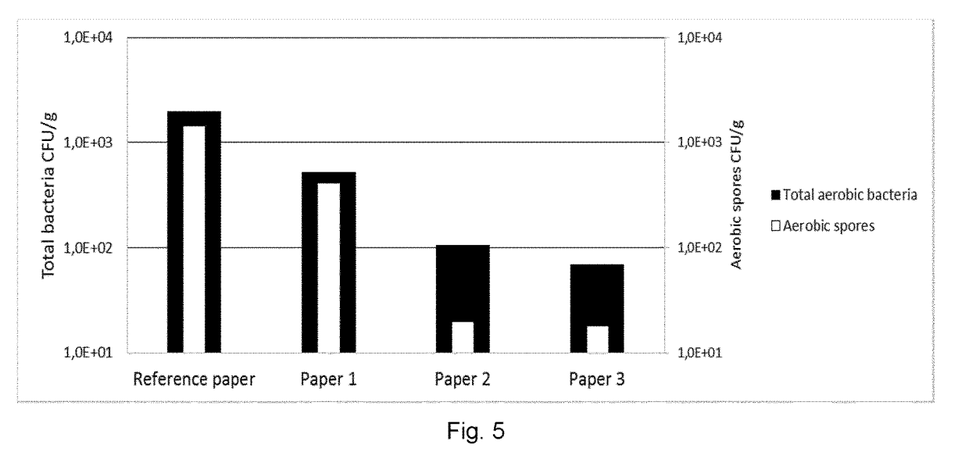

FIG. 5 as well as Table 1 show results from microbiological examination of the dry paper samples that were produced in the pilot paper machine with different dosages of Composition 1-5 in the pulp slurry.

TABLE 1

| Results of example 5. | | |
|---|---|---|
| | Total aerobic bacteria (cfu/g) | Aerobic spores (cfu/g) |
| Reference paper, without added composition to the pulp | 1 973 | 1 423 |
| Paper 1 Dosage: 100 mg/l composition 1-5 | 523 | 414 |
| Paper 2 Dosage: 150 mg/l composition 1-5 | 108 | 20 |
| Paper 3 Dosage: 300 mg/l composition 1-5 | 70 | 18 |

FIG. 5 and table 1 show that the reference paper contained high quantity of aerobic bacteria (1973 cfu/g) and aerobic bacterial spores (1423 cfu/g). This indicates that the contaminated raw material with high initial endospore content caused subsequent contamination of the produced paper. The treatment with the glutaraldehyde biocide was not alone capable to lower spore contamination in the produced paper.

Use of Composition 1-5 according to invention markedly decreased level of endospores in final paper at every tested dosage level. The method according to the invention showed sporicidal effect lowering the spore counts 1423 cfu/g (reference) to 414 cfu/g (with 100 mg/l treatment) or to 20 cfu/g (with 150 mg/l treatment) or to 18 cfu/g (with 300 mg/l treatment). Similarly, the total aerobic bacteria counts from the dry paper were significantly lower. Obtained results thus indicate that the invention provides a feasible solution for paper end-product hygienisation at a reasonable dosage level, which eventually enables food-packaging paper and board mills to produce the highest hygiene grades with maximum bacteria content of 250 cfu per gram of dry final paper or board.

Example 6

This laboratory test was performed to compare biocidal efficacy of three test products, namely a conventional biocide Composition R comprising glutaraldehyde (reference), and Compositions 1-6 and 2-6, which comprised a cationic surfactant comprising a primary ammonium head group and linear unsubstituted C12-alkyl tail, and a cationic surfactant comprising a secondary ammonium head group and linear unsubstituted C12-alkyl tail. Composition R comprised 50 weight-% of glutaraldehyde. Composition 1-6 comprised 40 weight-% of dodecylamine, 40 weight-% of dipropyleneglycol and 20 weight-% of water. Composition 2-6 comprised 35 weight-% of dodecylguanidine hydrochloride and 65 weight-% of dipropyleneglycol.

Products were tested against Total aerobic bacteria and Aerobic spores in authentic process water taken from a paper machine producing food-packaging board. At the moment of sampling from process, the authentic process water contained high amounts of Total aerobic bacteria, >100 000 cfu/ml, but very few Aerobic spores, <100 cfu/ml. In order to be better capable to evaluate product efficacies against Aerobic spores, the process water was spiked with additional spores, targeting for Aerobic spore level of ca. 100.000 cfu/ml. This spore solution for spiking was prepared as follows: Authentic spore-forming bacteria that were isolated from a paper making process were pre-grown for 2 days at +37° C. in modified nutrient broth, after which the mature spores were harvested, and washed by using centrifugation and cold water.

At the start of the test, the spore spiked process water was divided into eight individual samples. Two samples were treated with Composition 1-6, two with Composition 2-6 and two with a conventional Composition R. Compositions were dosed in such amount that the active amount of active agent was the same (90 mg/l) in each sample. In addition two samples were stored as such and used as 0-reference samples, without any added biocide. Samples were stored at 45° C., 180 rpm mixing, for 50 minutes, followed by quantification of Total aerobic bacteria (non-pasteurized samples) and Aerobic spores (plate count agar, +37° C., 2 days incubation). Prior to the aerobic spore determination, samples were pasteurized at +82° C. for 10 min. Results are shown as average values of two parallel samples in FIG. 6 and Table 2.

TABLE 2

Results of example 6.

|   | Total aerobic bacteria (cfu/ml) | Aerobic spores (cfu/ml) |
|---|---|---|
| 0-reference (no added biocides) | 379 000 | 92 000 |
| Composition 1-6 (90 mg/l Dodecylamine) | 5 050 | 2 500 |
| Composition 2-6 (90 mg/l Dodecylguanidine hydrochloride) | 3 300 | 760 |
| Composition R, reference (90 mg/l Glutaraldehyde) | 655 000 | 115 000 |

Figure 6:
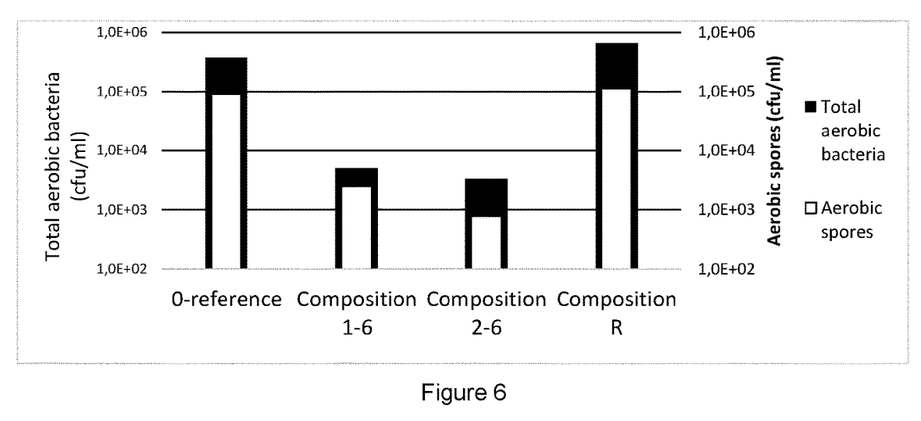

Results in FIG. 6 and Table 2 for 0-reference sample clearly show that the process water, after spiked with spores, contained a large amount of Total aerobic bacteria, 379 000 cfu/ml, and Aerobic spores, 92 000 cfu/ml. Composition 1-6 effectively decreased Total aerobic bacteria level from 379 000 cfu/ml to 5050 cfu/ml and Aerobic spore level from 92 000 cfu/ml to 2500 cfu/ml. Composition 2-6 effectively decreased Total aerobic bacteria level from 379 000 cfu/ml to 3300 cfu/ml and Aerobic spore level from 92 000 cfu/ml to 760 cfu/ml. It is seen that both Compositions 1-6 and 2-6 were surprisingly effective in decreasing Total aerobic bacteria as well as Aerobic spores. On the contrary, reference Composition R was non-effective against Total bacteria and Aerobic spores. Obtained results thus indicate that the use of two tested Compositions 1-6 and 2-6 according to the invention, containing dodecylamine or dodecylguanidine hydrochloride as active agent, can be effective for hygienization of paper making process streams with high total bacteria and aerobic spore content.

Example 7

This laboratory test was performed to evaluate efficacy of a Composition 1-7 according to the invention and comprising a cationic surfactant comprising a secondary ammonium head group and linear unsubstituted C12-alkyl tail, against Total aerobic bacteria and Aerobic spores in authentic process water taken from a paper machine producing food packaging board. Composition comprised 35 weight-% of dodecylguanidine hydrochloride and 65 weight-% dipropyleneglycol.

At the start, the process water was divided into four individual samples; two were treated with Composition 1-7 and two samples were stored as such and used as 0-reference (process water without added biocides). Samples were stored at 45° C., 180 rpm mixing, for 30 minutes, followed by quantification of Total aerobic bacteria (non-pasteurized samples) and Aerobic spores (plate count agar, +37° C., 2 days incubation). Prior to the aerobic spore determination, samples were pasteurized at +82° C. for 10 min. Results of two parallel samples are shown as average values in FIG. 7 and Table 3.

TABLE 3

Results of example 7.

|   | Total aerobic bacteria (cfu/ml) | Aerobic spores (cfu/ml) |
|---|---|---|
| 0-reference (no added biocides) | 1 162 500 | 70 |
| Composition 1-7 (90 mg/l Dodecylguanidine hydrochloride) | <100 | 25 |

Figure 7:
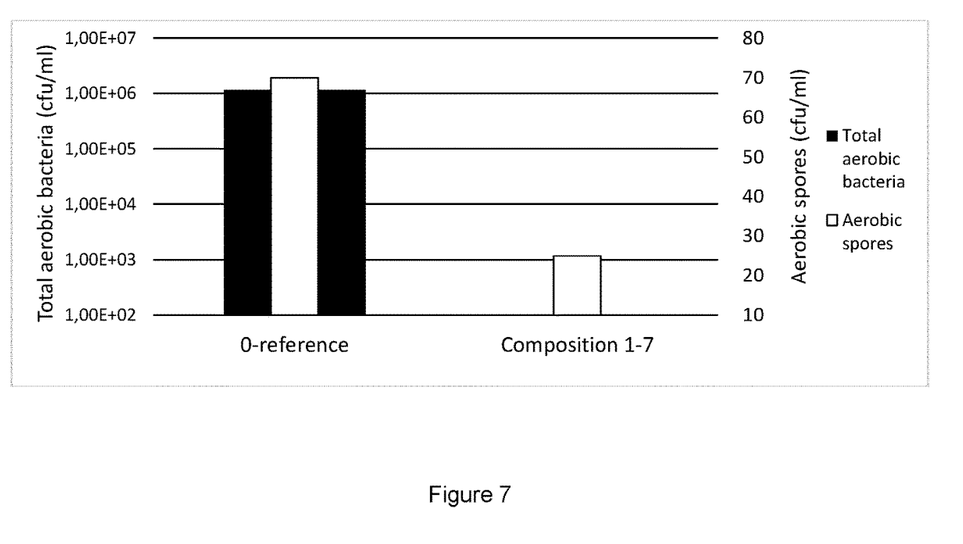

Results in FIG. 7 and Table 3 show that the process water as such contained a large amount of Total aerobic bacteria, 1 162 500 cfu/ml, and some Aerobic spores, 70 cfu/ml. Composition 1-7, at active agent dosage of 90 mg/l Dodecylguanidine hydrochloride, showed excellent hygienisation effect of the process water. Total aerobic bacteria level dropped from 1 162 500 cfu/ml to <100 cfu/ml, which is below practical detection limit, and the level of Aerobic spores decreased from 70 cfu/ml to 20 cfu/ml. Obtained results thus indicate that the Composition 1-7, with dodecylguanidine hydrochloride as the active agent, may effectively be used to hygienize paper making process streams containing aerobic bacteria and bacterial spores.

Even if the invention was described with reference to what at present seems to be the most practical and preferred embodiments, it is appreciated that the invention shall not be limited to the embodiments described above, but the invention is intended to cover also different modifications and equivalent technical solutions within the scope of the enclosed claims.

The invention claimed is:

1. A method for quantitatively reducing bacterial endospores in a pulp suspension for making of paper or board, comprising:
   obtaining an aqueous pulp suspension,
   administering to the pulp suspension a composition for germination of the endospores consisting of a cationic surfactant, comprising a primary or a secondary ammonium head group and a linear unsubstituted C12-alkyl tail; and an organic solvent, which comprises at least one hydroxyl group; and optionally a non-oxidizing biocide and/or water, allowing the cationic surfactant of the composition to interact with the bacterial endospores in the pulp suspension, and to induce germination of the endospores, and destroying microorganisms by using a biocidal agent, heat or by the cationic surfactant itself.

2. The method according to claim 1, wherein amount of the cationic surfactant in the composition is at least 10 weight %.

3. The method according to claim 1, wherein amount of the organic solvent in the composition is 10 weight-%-90 weight-%.

4. The method according to claim 3, wherein amount of the cationic surfactant in the composition is 10 weight-%-60 weight-%.

5. The method according to claim 1, wherein the organic solvent is selected from glycols and alcohols.

6. The method according to claim 1, wherein the biocidal agent is a non-oxidizing biocide selected from group comprising glutaraldehyde, 2,2-dibromo-3-nitrilopropionamide, 2-bromo-2-nitropropane-1,3-diol, carbamates, 5-chloro-2-methyl-4-isothiazolin-3-one, 2-methyl-4-isothiazolin-3-one, 1,2-dibromo-2,4-dicyano butane, bis(trichloromethyl) sulfone, 2-bromo-2-nitrostyrene, 4,5-dichloro-1,2-dithiol-3-one, 2-n-octyl-4-isothiazolin-3-one, 1,2-benzisothiazolin-3-one, ortho-phthaldehyde, quaternary ammonium compounds, a guanidine salt other than dodecylguanidine salts, biguanidines, pyrithiones, 3-iodopropynyl-N-butylcarbamate, phosphonium salts, dazomet, 2-(thiocyanomethylthio)benzothiazole, methylene bisthiocyanate and any combinations thereof.

7. The method according to claim 1, wherein amount of optional non-oxidizing biocide in the composition is 0.01 weight-%-20 weight-%.

8. The method according to claim 1, wherein the cationic surfactant is n-dodecylamine or a dodecylguanidine salt.

9. The method according to claim 1, wherein the composition for germination of the endospores is administered to at least one process location selected from a pulp and/or broke storage tower, a pulp thickener, a pulp and/or broke pulper.

10. The method according to claim 9, wherein the composition for germination of the endospores is administered in an amount that provides a negative delta spore value between inlet and outlet of the selected process location.

11. The method according to claim 1, wherein the composition for germination of the endospores is administered in an amount that provides a dosage of the cationic surfactant to the pulp suspension in a range of 1 ppm 1000 ppm.

12. The method according to claim 1, further comprising administering an oxidizing biocide to the pulp suspension.

13. The method according to claim 12, wherein the oxidizing biocide is administered to the pulp suspension in an amount of 1 ppm-30 ppm.

14. The method according to claim 1, further comprising adding a chelating agent in an amount of 1 ppm-100 ppm, given as an active agent, to the pulp suspension at the latest with the administration of the composition for germinating the endospores.

15. The method according to claim 14, wherein the chelating agent is selected from diethylenetriamine pentaacetate (DTPA) or ethylenediaminetetraacetic acid (EDTA).

16. The method according to claim 1, wherein the cationic surfactant is dodecylguanidine hydrochloride.

17. The method according to claim 11, wherein administering the composition for germinating the endospores is in an amount that provides a dosage of the cationic surfactant to the pulp suspension in a range of 50 ppm-200 ppm, calculated as active cationic surfactant.

18. The method according to claim 12, wherein the oxidizing biocide is selected from halogenated hydantoins; monochloramines; monobromamines; dihaloamines; trihaloamines; or any combinations thereof.

19. The method according to claim 18, wherein the halogenated hydantoins are selected from monohalodimethylhydantoins or dihalodimethylhydantoins or any combinations thereof.

20. The method according to claim 18, wherein the halogenated hydantoin is monochlorodimethylhydantoin or chlorobromodimethylhydantoin.

21. The method according to claim 13, wherein the oxidizing biocide is administered to the pulp suspension in an amount of 1 ppm-10 ppm, as total active chlorine or percarboxylic acid.

22. The method according to claim 4, wherein amount of cationic surfactant in the composition is 25 weight-%-45 weight-%.

23. The method according to claim 3, wherein amount of the organic solvent in the composition is 10 weight-%-60 weight-%.

24. The method according to claim 5, wherein the alcohol is ethanol or isopropyl alcohol and the glycol dipropylene glycol.

* * * * *